United States Patent [19]

Sakane

[11] Patent Number: 5,794,969
[45] Date of Patent: Aug. 18, 1998

[54] STEERING WHEEL WITH AIR BAG DEVICE

[75] Inventor: Katsunobu Sakane, Ichinomiya, Japan

[73] Assignee: Toyoda Gosei Co., Ltd., Aichi-ken, Japan

[21] Appl. No.: 694,909

[22] Filed: Aug. 9, 1996

[30] Foreign Application Priority Data

Aug. 11, 1995 [JP] Japan ................. 7-205652

[51] Int. Cl.⁶ ..................................... B60R 21/16
[52] U.S. Cl. ........................... 280/731; 280/728.2
[58] Field of Search ..................... 280/731, 728.2, 280/728.3, 732

[56] References Cited

U.S. PATENT DOCUMENTS 5,149,127  9/1992  Manabe et al. ................ 280/731
5,152,549  10/1992  Aird ................................ 280/731
5,178,409  1/1993  Hiramitsu et al. ............... 280/731
5,303,952  4/1994  Shermetaro et al. ............. 280/731

*Primary Examiner*—Kenneth R. Rice
*Attorney, Agent, or Firm*—Cushman Darby & Cushman IP Group of Pillsbury Madison & Sutro LLP

[57] ABSTRACT

A steering wheel with an air bag device where the inflating charge is easily detonated prior to disposed of an automobile into scrap. The steering wheel has an air bag device, located at an upper center of the steering wheel, and a lower cover. The air bag device includes an inflator for expanding the air bag, and is connected by wiring to a source of an electrical actuation signal. The lower cover has a holder for holding part of a plug type connector on a side wall of the lower cover. A part or the whole of the side wall, having a holder, can be removed easily to permit the plug connector and the connection portion connected to the inflator to be readily exposed.

7 Claims, 5 Drawing Sheets

STEERING WHEEL WITH AIR BAG DEVICE

The following priority application, Japanese Patent Application No. Hei 7-205652, filed in Japan on Aug. 11, 1995, is hereby incorporated by reference into the present specification.

BACKGROUND OF THE INVENTION

1. Field of the Invention

This invention relates to a steering wheel with an air bag device, and more particularly to a steering wheel with an air bag device that can be detonated easily to simplify disposal.

2. Description of Related Art

A conventional air bag device is located on a support or boss mounted at the center of a steering wheel. The air bag device comprises an air bag and an inflator designed to inflate the air bag by gas in a crash situation. An electrical line is connected to the inflator for inputting an electrical signal to activate detonation of an explosive charge contained within the inflator. Such an electrical line frequently includes a plug type connector having one part electrically connected to the inflator and another part that can provide an electrical connection to an actuation sensor. Such a plug type connector is usually located between the air bag device and a lower cover of the steering wheel, located under the air bag support.

The plug type connector is located in the steering wheel assembly because the steering wheel is itself initially connected on a steering shaft. Then, the remaining portions of the steering wheel are assembled from the interior outwardly. Consequently, the plug connector connected to the inflator will be positioned adjacent the lower cover.

Since an undetonated inflator poses certain risks when the useful life of the steering wheel assembly is over, and prior to disposal of such an air bag system, the air bag device is preferably inflated, and the explosive charge detonated, by inputting a separate electrical signal to cause such detonation. It is both safer and easier if such deformation can occur prior to removing the air bag device from the steering wheel or the steering wheel from the vehicle.

A maintenance lid covering a small and narrow opening is sometimes fixed on the bottom of the steering wheel assembly but is removable from the steering wheel after taking off mounting screws. Such a lid is not at a very convenient place, however, on the bottom of the steering wheel assembly. Then, with the lid removed, a worker can search for the proper electrical connection, provided between the inflator and the actuation sensor, from inside of the steering wheel assembly where it is placed and when located the connector to the inflator can be exposed. Next, the inflator connector can then be connected to an electrical signal inputting device for creating a separate inflating actuating signal to detonate the explosive charge. Once the air bag device is inflated the potential harm will have been eliminated.

In order to properly obtain the connection between the inflator and the actuation sensor, the amount or length of wire used needs to be longer so that a sufficient length exists to allow the plug connection to be located and physically pulled out through the opening resulting from lid removal.

SUMMARY OF THE INVENTION

The present invention has an object of providing a steering wheel assembly with an air bag device that includes easier access to the inflator plug connection to simplify detonation. In addition, less wire is required, assembly is simplified, and finding the plug connector is readily assured.

A steering wheel assembly according to this invention comprises a ring, a plurality of spokes, a boss or support, an air bag device, located on the boss, and a lower cover, located under the boss. The air bag device includes an inflator for expanding the air bag. The inflator is connected by a wire to an actuation sensor and the source of an electrical signal to initiate detonation of an explosive charge within the inflator upon impact. The inflator connector is attached to a cover. The lower cover includes a bottom wall and a side wall that extends upwardly from a periphery of the bottom wall. Part of the plug connector is fixed to the side wall of the lower cover and in particular, is attached to a portion of the side wall that is openable.

Therefore, when it becomes necessary or desirable to dispose of the air bag device, the lower cover, the part of the cover to which the plug connector is fixed, is opened or removed from the steering wheel assembly together with the inflator connector part of the plug connector that is automatically exposed when the cover portion is opened. Then, the connection between both parts of the plug connectors can be easily separated and the inflator connection portion can be used for connection to a detonation signal.

Because plug connection is fixed to the side wall of the lower cover, the length of wire required to expose the plug connection to the inflator is greatly reduced and is shorter than the connecting wire used in conventional assemblies. Therefore, space in the steering wheel assembly can be spread.

DETAILED DESCRIPTION OF THE PREFERRED EMBODIMENT

Figure 1:
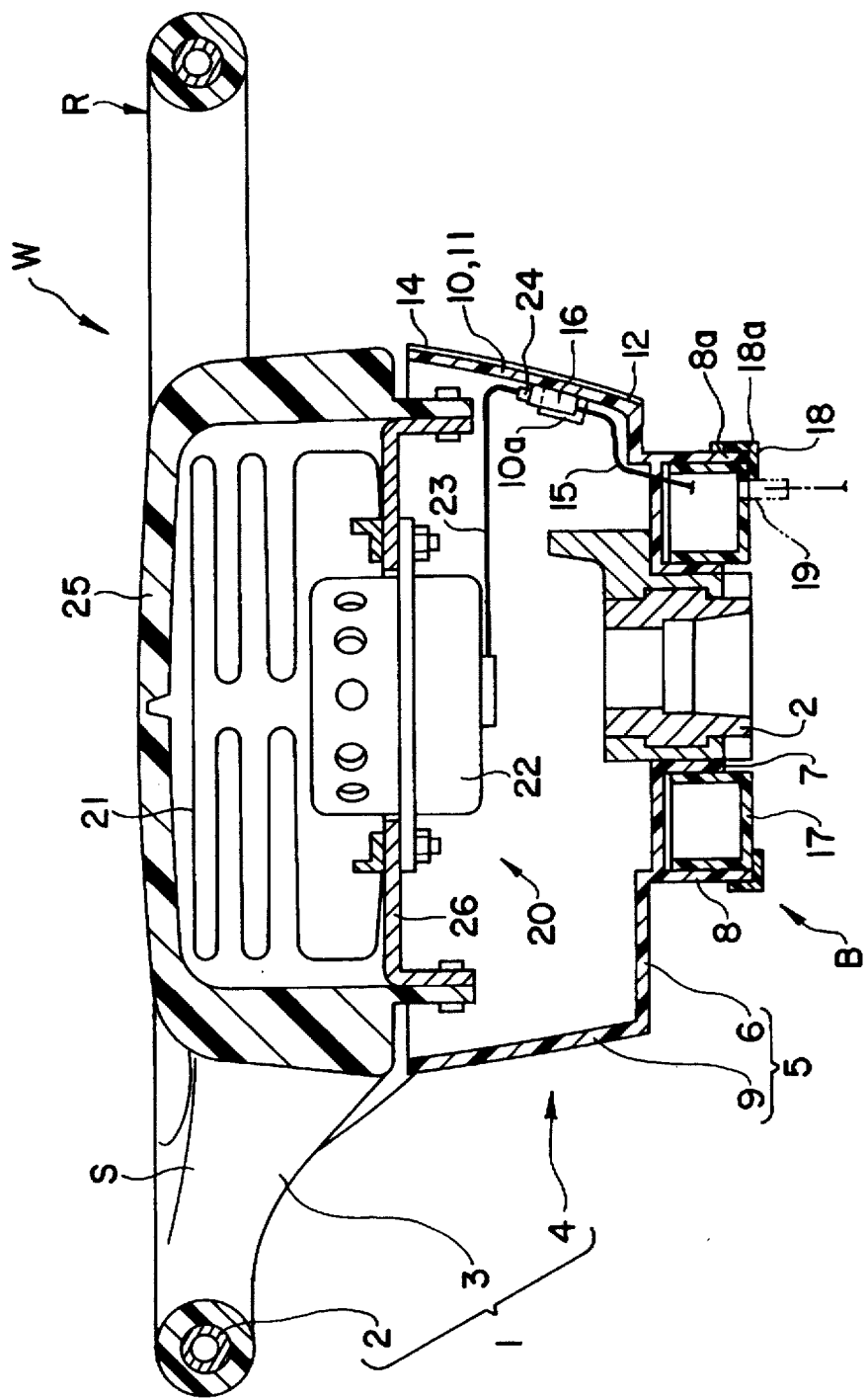
FIG. 1 is a sectional view showing a steering wheel according to the first embodiment of the present invention.

As shown in FIG. 1, the steering wheel W comprises a steering wheel assembly or steering wheel main body 1 and an air bag device 20. The steering wheel main body 1 comprises an annular ring portion R with a core 2, a boss portion B, located at the center of the annular ring portion R, and spoke portions S for connecting the annular ring portion R to the boss portion B. The steering wheel main body 1 also includes a cover portion 3, covering the core of the ring portion R and spoke portions S, and a lower cover 4, covering under the boss portion B.

The air bag device 20, which becomes mounted on the boss portion B, includes a folded air bag 21, an inflator 22, including an explosive charge for supplying expansion gas to the folded air bag 21, a pad 25 covering the folded air bag 21 and designed to open when the air bag 21 inflates, a bag holder 26 for securing the air bag 21 in place, and also attaching the inflator 22 and the pad 25 to the steering wheel main body 1.

The inflator 22 is connected by a wire to the actuation sensor and the source of an elector signal to control when the air bag 21 inflates.

Figure 2:
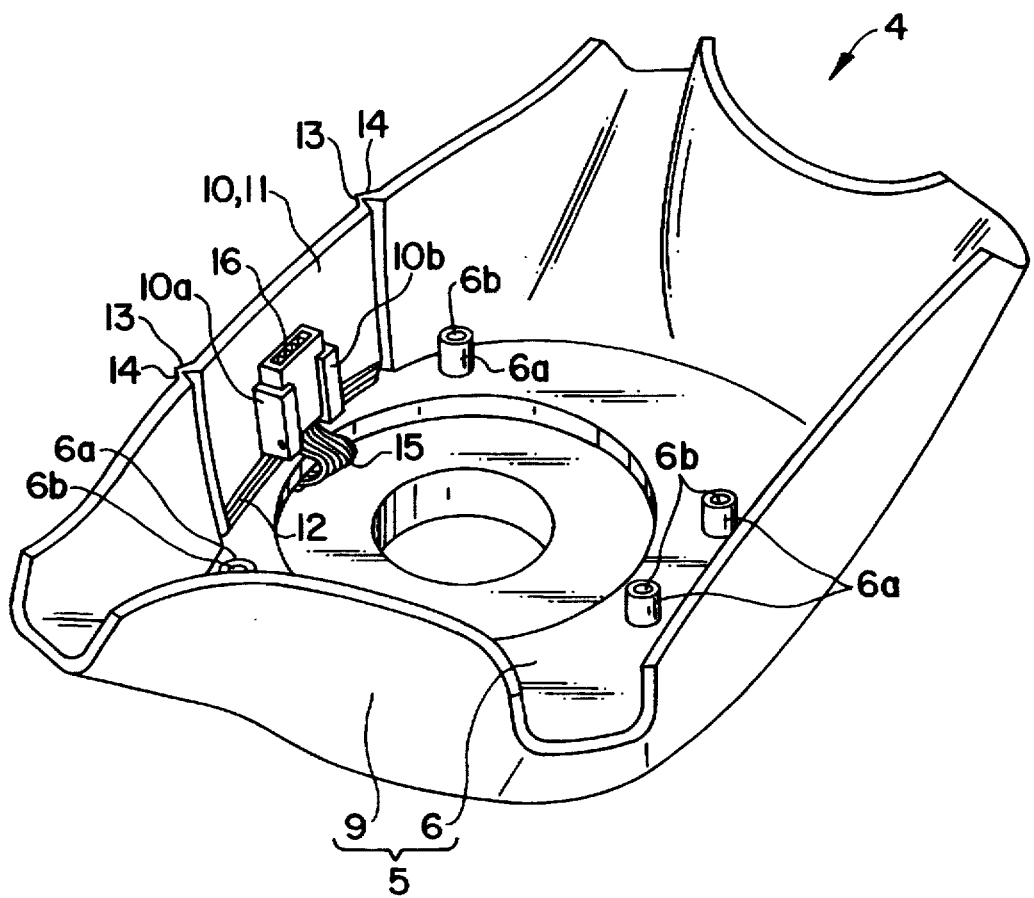
FIG. 2 is a perspective view showing a lower cover to be used in the steering wheel in FIG. 1.
Figure 3:
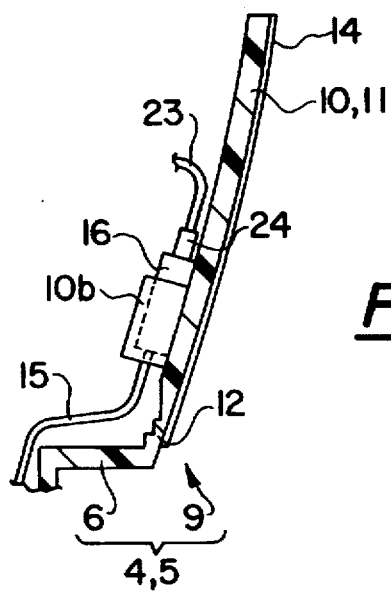
FIG. 3 is a sectional view showing an enlarged view of a portion of the side wall in FIG. 1.

As shown in FIGS. 1, 2 and 3, the lower cover 4, made of resin, comprises a substantially annular bottom wall 6, having a step, and a side wall 9, extending upwardly from a periphery of the bottom wall 6. The lower cover 4 further comprises a rotor 17, located under the bottom wall 6. The rotor 17 receives a spiral cable, which is not shown in the Figures. The spiral cable is wound in rotor 17 so that an elector signal can be generated as the steering wheel rotates. A plug connector is comprised of a connector portion 16, attached to the inside of the side wall 9 of lower cover 4, and an inflator connection 24 plugged into portion 16. The spiral cable provides a connection between connector 16 and a terminal 19 at lower side. A cover 4 when a suitable wire harness (not shown) adjacent the column can be connected.

The rotor 17 is located between a cylindrical inside wall 7 and a cylindrical outside wall 8, with both walls 7 and 8 extending downwardly from the bottom wall 6. The rotor 17 is rotatably held by a holder 18. Holes 18a of the holder 18 receive and provide a coupling for a plurality of projections 8a provided on the outside surface of wall 8. When rotating the steering wheel W, the rotor 17 does not rotate with but relative to the lower cover 4.

As shown in FIG. 2, the bottom wall 6 of cover 4 includes four upstanding fixing projections 6a, each having an axially extending fixing hole 6b thereon. The lower cover 4 is fixed at the boss B by screws that pass through hole 6b of projections 6a.

A front side inside surface of the side wall 9 has an engagement portion formed from facing brackets 10a, 10b in which the plug connector portion 16 is held.

As will now be explained, the part of side wall 9 extending around engagement portion 10a, 10b will become a door 11 to which the connector portion 16 is mounted. The bottom edge of door 11 is formed with a hinge portion 12 that includes a thinned portion. The opposite sides of door 11 are formed by a preformed or predetermined thinned or breakable portion 13 that extend upwardly from hinge 12 along side wall 9. The breakable portion 13 can be observed or seen on the outside surface of the side wall 9 and can include an outwardly projecting mark shown at 14.

The steering wheel assembly process begins with the lower cover 4 being mounted to the steering wheel main body 1 with screws by using the fixing projections 6a. The steering wheel main body 1 is then mounted on the steering shaft by using the boss B. Then, the terminal 19, extended from the rotor 17, is connected to a column positioned wire harness.

Next, the connector portion 16 is connected to the inflator connector 24 as in FIG. 3. The air bag device 20 is thereafter mounted on the steering wheel main body 1 by using the bag holder 26. Finally, the steering wheel W is attached to an automobile.

When the inflator 22 receives an actuation electrical signal for inflating during driving the automobile, the inflator 22 detonates and inflates and expands the air bag 21. The expanding air bag 21 will, as it leaves the steering wheel, tear the covering pad 25 and expands to its full extent.

Figure 4:
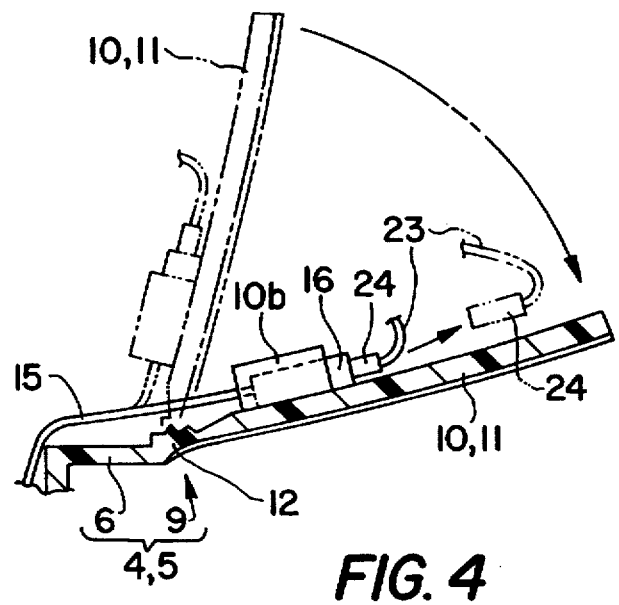
FIG. 4 is a sectional view showing an enlarged part of the removed side wall including a connector portion fixed thereto.

When scrapping an old or used automobile that includes an undetonated air bag device 20, first, the breakable portion 13 of the door 11 is cut or broken. As shown in FIG. 4, the door 11 rotates about hinge 12 to the outside, thereby exposing plug connector portions 16 and 24. Then, the connector portions 16 and 24 can be taken out or pulled from the lower cover 4.

The connector portion 24 is removed or unplugged from connector portion 16, as shown in FIG. 4, and can be directly connected to a signed generator for inputting an electrical signal that will cause detonation of the explosive charge to occur.

Therefore, by having connector portion 16 fixed to door 11, it is easier to locate and use these connectors 16 and 24.

As shown in FIG. 2, the projection mark 14 is formed on the surface of the predetermined thinned, breakable portions 13, thus simplifying finding door 11 and breakable portions 13. It is also easy to cut the thinned, breakable portions 13.

Figure 5:
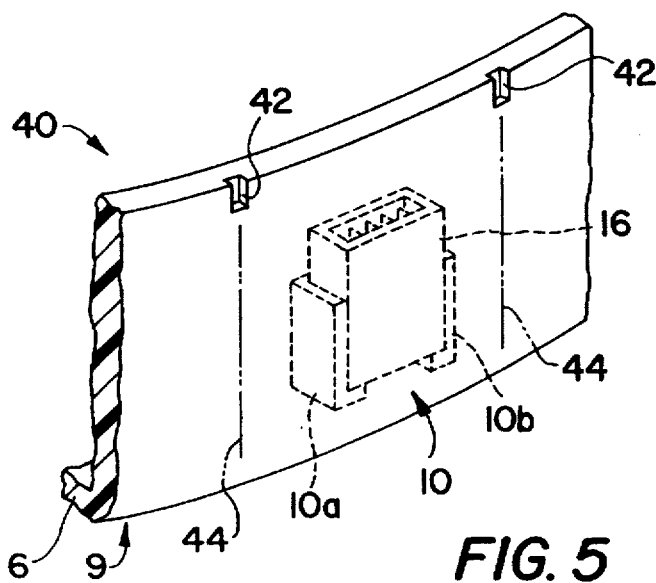
FIG. 5 is a sectional view of a portion of the lower cover according to second embodiment of the present invention.

A portion of the lower cover 40 of a second embodiment is shown in FIG. 5. The lower cover 40 includes a breakable area mark 42 in the form of a groove or indentation on the outer surface of the door 10. Mark 42 is aligned with the thinned portion 44. Alternatively, the predetermined thinned portion 44 could be shown by color.

Figure 6:
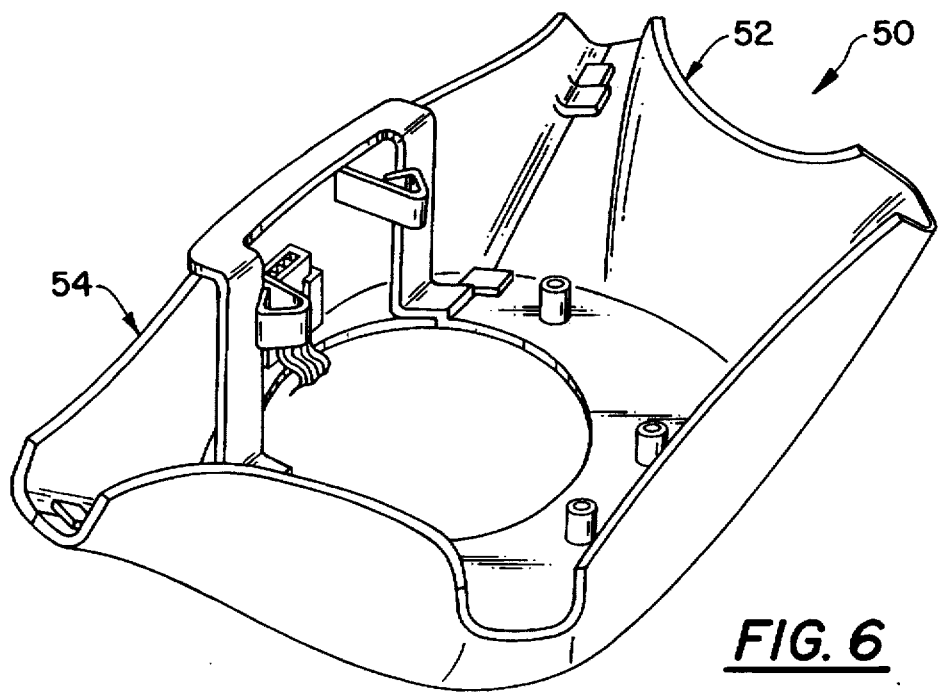
FIG. 6 is a perspective view showing a lower cover according to third embodiment of the present invention.
Figure 7:
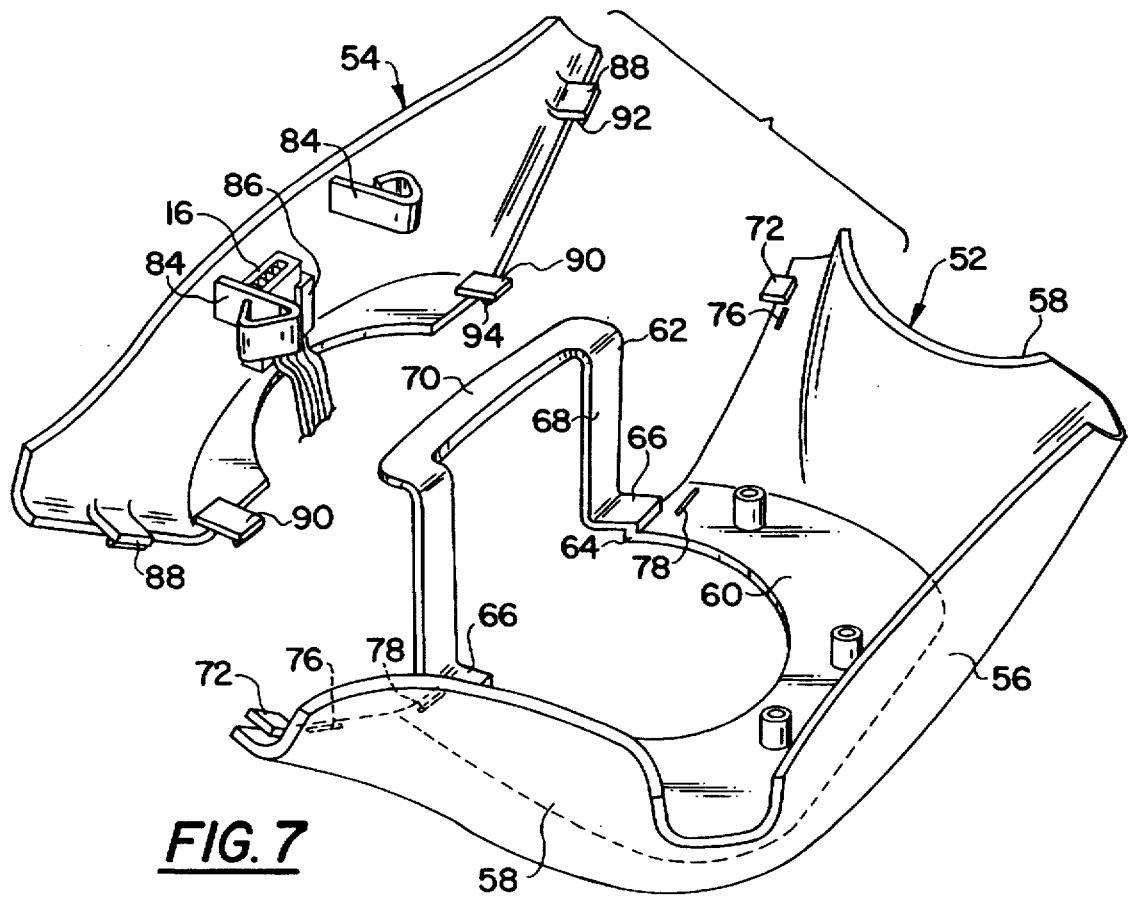
FIG. 7 is an exploded perspective view of the third embodiment.

The lower cover 50 of a third embodiment is shown in FIGS. 6 and 7. The lower cover 50 comprises a main body 52 and a removable side wall 54. The main body 52 comprises three side walls 56, 58, a bottom wall 60 and a fixing bar 62, extending upwardly from a lower edge on bottom wall 64. The fixing bar 62 includes a bottom side 66, a vertical side 68 and an upper side 70. The main body 52 further comprises two guide projections 72, formed on the side walls 58, and four grooves 76, 78, formed adjacent guide projections 72 and the next bottom side 66 of the fixing bar 62.

The removable side wall 54 includes two fixing claws 84, fixed to the opposite vertical sides 68 of the fixing bar 62, a holder portion 86, holding a lower cover side connector 16, and four claws 88, 90 having a fixing projection 92,94. When the removable side wall 54 is fixed to the main body 52, claws 84 are removably fastened to the inside edge of the fixing bar 68, and also four claws 88, 90 are removably fastened at each of grooves 76, 78.

Two claws 88 mounted on the removable side wall 54 and two guide projections 72 of the main body 52 guide and define a position of right and left direction when assembling. Other two claws 90 and bottom sides 66 also guide and define a position of right and left direction and up and down direction. Therefore, the removable side wall 54 is designed to be positioned against the main body 52.

The lower cover 50 of third embodiment is assembled to the steering wheel W as similar to the first embodiment.

First, connection portion 16 is retained in place by holder 86. The removable side wall 54 is fastened to the main body 52. Then, the lower cover is attached at the steering wheel W after the inflator connector portion 24 is connected to connector portion 16.

Therefore, a similar advantage as was found with the first embodiment, so too are similar advantages found here. When releasing these connector portions 16, 24, it is easier to take off these connector portions 16, 24 at this steering wheel W. To dispose of the air bag device 20 is now quite easy as the control wire is very accessible.

In addition, this embodiment has the additional advantage of making it easy to break a connection between connector portion 16 and connection portion 24.

Figure 8:
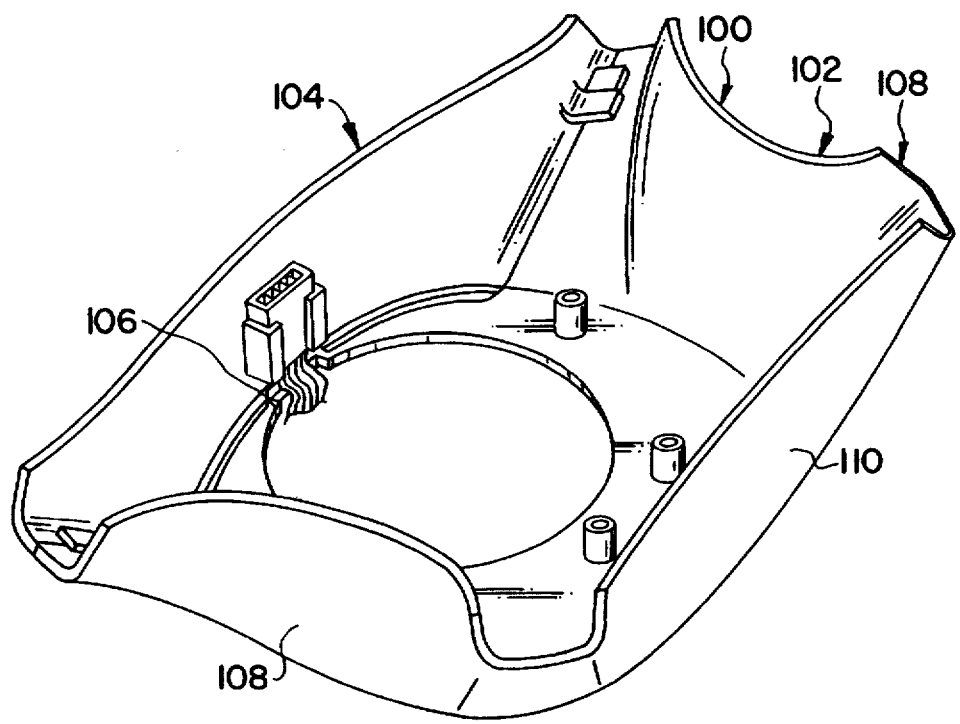
FIG. 8 is a perspective view showing a lower cover according to fourth embodiment of the present invention.
Figure 9:
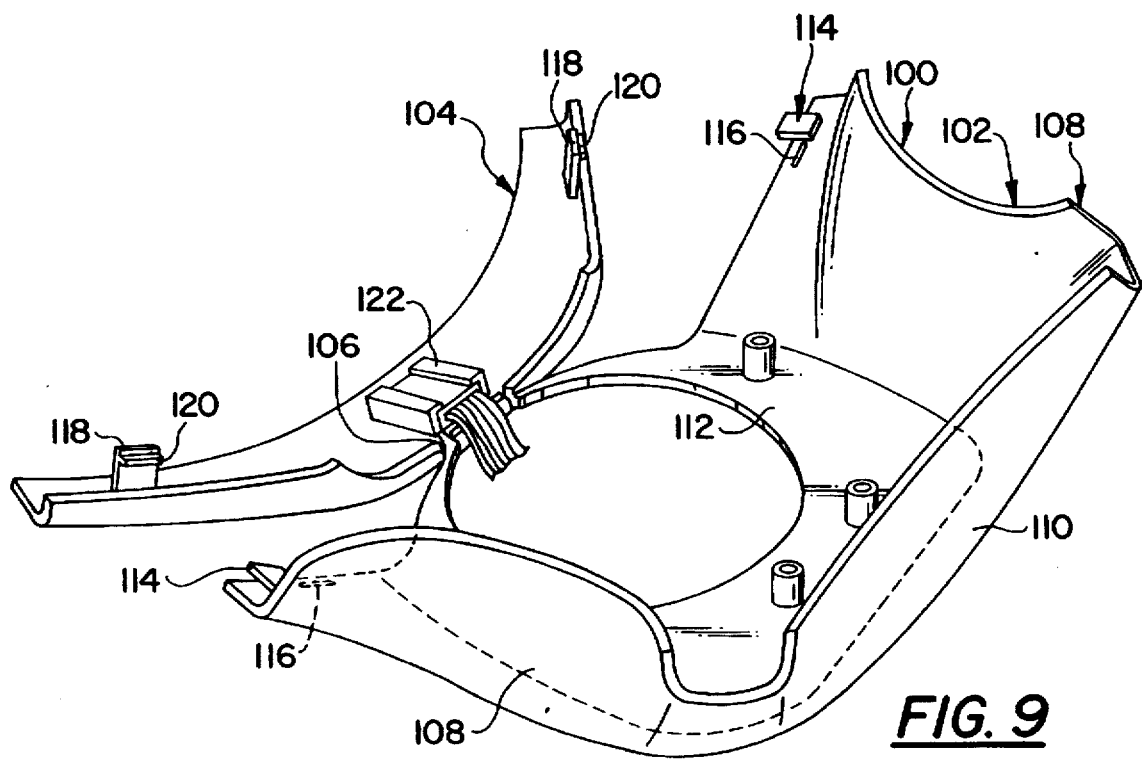
FIG. 9 is an exploded perspective view of the fourth embodiment.

The lower cover 100 of a fourth embodiment is shown in FIGS. 8 and 9. The lower cover 100 comprises a main body 102 and a removable side wall 104, connected to the main body 102 with a hinge 106. The main body 102 comprises three side walls 108, 110 and a bottom wall 112. Each side wall 108 has a guide projection 114 and a groove 116, formed at the next guide projection 114. The removable side wall 104 has a holder portion 122, holding connector portion 16, and two claws 118, having fixing projection 120 for fastening to the groove 116.

The lower cover 100 of the fourth embodiment is assembled to the steering wheel W in a manner similar to that described above for the first embodiment.

First, connector portion 16 is connected to holder 122. The removable side wall 104 is fastened to the main body 102. Then, the lower cover 100 is attached at the steering wheel W after the inflator connector portion 24 is connected to connector portion 16.

Therefore, a similar advantage to that of the first embodiment is realized as well so that when releasing connection portions 16, 24, it is easy to dispose of the air bag device 20.

What is claimed is:

1. A steering wheel and air bag device comprising:

a steering wheel main body;

an inflator located on said steering wheel main body, said inflator having a first connector member;

a cover enclosing said inflator and including a side wall at least a portion of which is openable;

a second connector member fixed on said side wall openable portion, said second connector member being connected to said first connector member.

2. A steering wheel and an air bag device comprising:

a steering wheel main body;

an air bag inflator located on said steering wheel main body, said inflator including a first electrical connector;

a cover enclosing said inflator, said cover having a side wall;

said side wall including a releasable door, said releasable door having a holder in which a second electrical connector is mounted so that said second electrical connector moves with said releasable door.

3. A steering wheel according to claim 2, wherein said releasable door is defined by at least one tearing line extending along said side wall.

4. A steering wheel according to claim 3, wherein said releasable door is connected to said cover by a hinge.

5. A steering wheel according to claim 2 wherein said releasable door comprises a removable side wall.

6. A steering wheel according to claim 5, wherein said removable side wall is releasably held to said cover by a hinge and is attached to said cover by a hinge.

7. A steering wheel and an air bag device comprising:

an inflator attached to said device and connected by an electrical line to an actuating signal source;

a cover attached to said steering wheel and enclosing said inflator and including an openable portion; said electrical line including a breakable connector attached to said openable portion so as to be accessible when said openable portion is opened.

* * * * *